United States Patent [19]

Thom

[11] 4,108,955
[45] Aug. 22, 1978

[54] METHOD FOR MAKING A FISHING LURE

[76] Inventor: Joseph R. Thom, 1217 Johnson Ave., Point Pleasant, N.J. 08742

[21] Appl. No.: 779,626

[22] Filed: Mar. 21, 1977

[51] Int. Cl.² .......................... B29C 5/00; B29D 3/00
[52] U.S. Cl. .................................. 264/222; 264/225; 264/261; 264/271; 264/299
[58] Field of Search .............. 264/261, 263, 219, 225, 264/259, 271, 328, 275, 299, 264, 313, 220, 222, 338; 43/42, 42.08, 42.24, 42.53

[56] References Cited

U.S. PATENT DOCUMENTS

| | | | |
|---|---|---|---|
| 2,718,033 | 9/1955 | Burke | 264/263 |
| 3,070,917 | 1/1963 | Rowe | 43/42.24 |
| 3,165,858 | 1/1965 | Rutter | 43/42.24 |
| 3,328,502 | 6/1967 | Robson | 264/271 |
| 3,967,406 | 7/1976 | Anderson | 43/42.24 |

FOREIGN PATENT DOCUMENTS

640,471 5/1962 Canada .................................. 43/42.24

*Primary Examiner*—W. E. Hoag
*Attorney, Agent, or Firm*—Charles F. Gunderson

[57] ABSTRACT

Fishing lures are made by molding or casting in a two part mold. The lower part of a mold form is first filled with mold material, and a specimen of bait fish is partially embedded in this lower part of the mold, with suitable means for release of the bait fish if necessary. Appurtenances such as hooks, suitable to the lure, are also partially embedded in the lower part of the mold, at strategic locations along the bait fish, as is a metallic eye adjoining the head of the bait fish. Other devices for filling and venting the mold may also be added at this time. The upper part of the mold form is then filled with mold material on top of the bottom part — with suitable means for separating the two parts if necessary — until the bait fish and all of its appurtenances are completely covered. When the mold material is set, the parts are separated, and the specimen of bait fish and all of its appurtenances are removed. Then the molding hardware inserts, including similar hooks and an eye for the lines are set in the mold and the mold is filled with molding material to produce an exact replica of the bait fish, complete with all necessary hardware inserts.

7 Claims, 6 Drawing Figures

METHOD FOR MAKING A FISHING LURE

BACKGROUND OF THE INVENTION

There are very many types of fishing lures that are designed to suggest or approximate the size and shape of various bait fish. These may be made of very many types of materials, and may or may not be articulated to also suggest the motion of the fish in the water. All of these fishing lures include hooks of various kinds and in various combinations to hook any fish that is attracted to and tries to swallow the lure.

These lures may be more or less effective, but they are, at best, only approximations of the fish that they intend to mimic. In fact, most of the lures are only crude suggestions of a fish, since more exact copies would require the time consuming and exacting work of a considerable artist to produce a reasonably-close facsimile of an actual bait fish. Furthermore, the same skill and detail would be required to produce a similar lure representing any other of the innumerable types of bait fish — as well as to cover the many different sizes of a single type of bait fish that might be successful as a lure.

It is therefore an object of this invention to provide a method for making a fishing lure that will provide an almost exact duplicate of almost any available bait fish, of almost any desired size.

It is a further object of this invention to provide a method for making a fishing lure that can have almost any combinations of hooks and connections for leaders.

It is a further object of this invention to provide a fishing lure that can be made, relatively-simply, by a relatively-unskilled fisherman, of materials providing a wide variety of combinations of resiliency and weight, for fishing for almost any known game fish under a wide variety of waters and conditions. These and other objects are accomplished by:

SUMMARY OF THE INVENTION

A method for making fishing lures wherein a bait fish of any desired size and shape is partially embedded in a freshly poured bed of mold material to form the lower part or portion of a mold. Suitable hooks and other connecting hardware or equipment may be embedded with the bait fish to facilitate the inclusion of corresponding inserts in the molding process. Also, devices for forming suitable ducts or channels for pouring in the molding material as well as for providing for the excape of air may be included at this point. Additional mold material is then poured on top of the lower portion to cover the bait fish and form the upper part or portion of the mold.

Suitable mold release agents may be provided about the bait fish, and between the two parts of the mold, as necessary.

When the mold material has hardened, the upper part may be lifted, and the bait fish and any hooks and other connecting hardware can be removed. Similar hooks and interconnecting, accessory hardware are put into the mold, which is closed and filled with the desired molding material, to produce a fishing lure.

DETAILED DESCRIPTION OF THE PREFERRED EMBODIMENT

Figure 1:
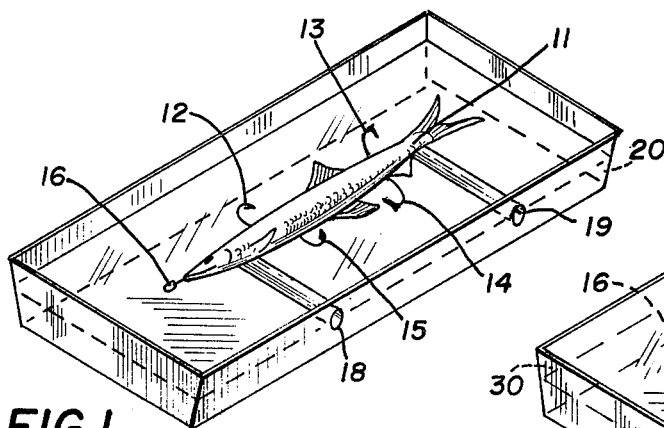
FIG. 1 shows the lower part of the mold with a bait fish and appurtenances partially embedded.

Referring now more particularly to FIG. 1, the lower part or portion of the mold 20 is seen with a bait fish specimen 11 with typical hooks 12 through 15 arranged in a suitable pattern around the specimen, and an eye 16 positioned at the head of the bait fish specimen. Rods 18 and 19 are also embedded in the lower part of the mold for filling or venting.

Figure 2:
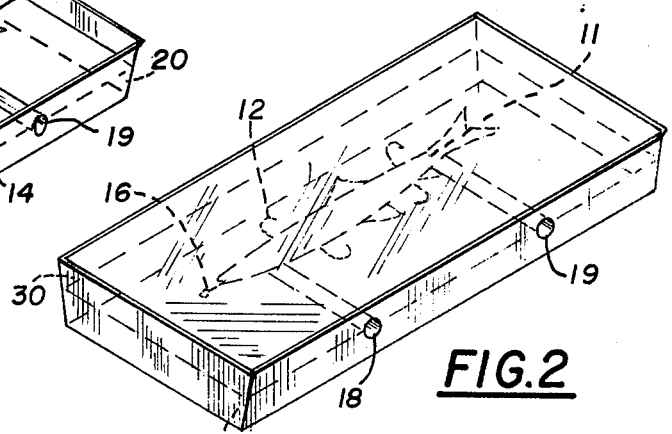
FIG. 2 shows the upper part of the mold poured on top of the bait fish.

FIG. 2 shows the addition of the upper part of the mold, 30 poured on top of the lower part to complete the mold. The elements of FIG. 1 are seen again and are similarly numbered.

Figure 3:
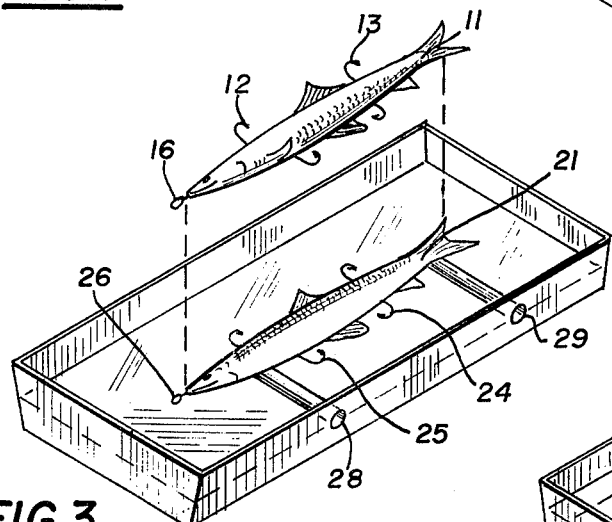
FIG. 3 shows the bait fish removed from the completed mold.

FIG. 3 shows the bait fish specimen 11 with its accessory hooks and eye removed from the hardened mold leaving the impression 21 for the bait fish specimen and the impressions 22 through 25 and 26 for the corresponding hooks and eye. The impressions 28 and 29 are of the rods 18 and 19.

Figure 4:
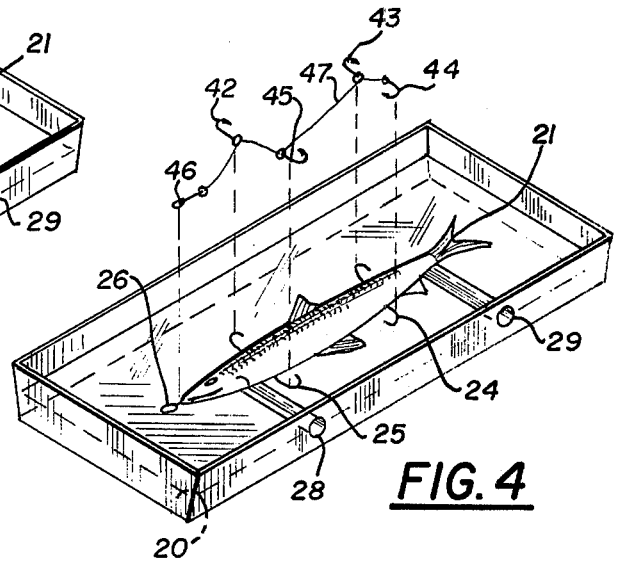
FIG. 4 shows the necessary inserts positioned within the mold.

FIG. 4 shows the lower part of the mold 20 with its impressions of the bait fish specimen, hooks and eye, again similarly numbered. In this figure the hardware, including the hooks 42 through 45, and eye 46 and an interconnecting wire 47, are shown above the mold ready to be set into the mold before the final molding process.

Figure 5:
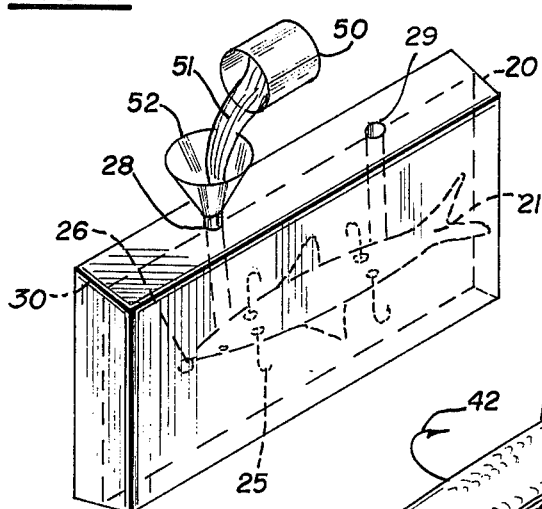
FIG. 5 shows the mold being filled with molding material.

FIG. 5 shows the two halves 20 and 30 of the mold together with a container 50 of molding material 51 being poured through a funnel 52 into the mold cavity 21 etc. through the opening 28.

Figure 6:
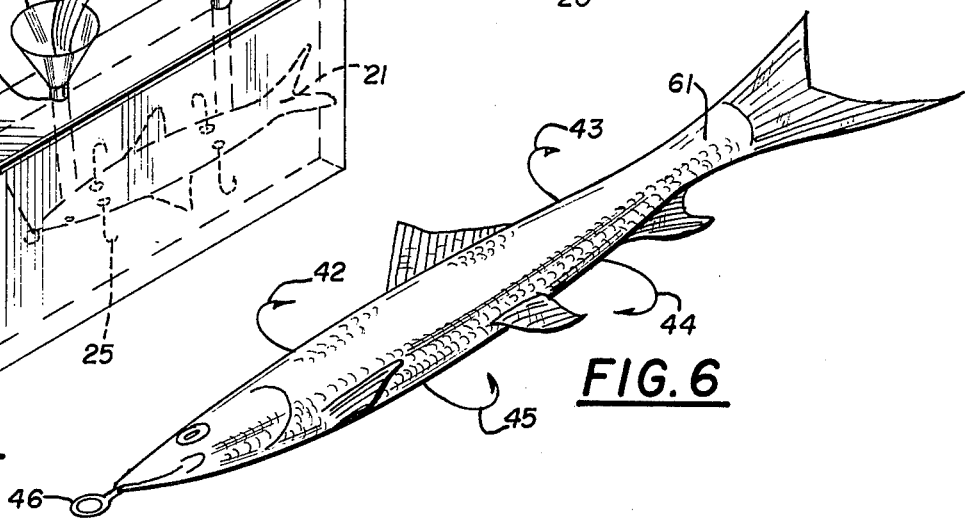
FIG. 6 shows an enlarged view of the finished fish lure.

FIG. 6 shows an enlarged view of a resultant lure 61 with the hooks 42 through 45 and the eye 46 embedded into the molding material.

In accordance with this method of making a fishing lure, mold material is first poured into a suitable container — not shown for simplicity — to form the lower part of the mold. While the mold material is still quite soft, a specimen of bait fish 11 is partially embedded in the lower part of the mold. In this case, suitably placed hooks 12 to 15, and an eye 16 are also partially embedded in the lower part of the mold. Rods 18 and 19 are also added and impressed into the soft mold material between the specimen of bait-fish and the edge of the mold to provide the necessary access to the eventual mold cavity.

The mold material is then poured on top of the lower part to completely cover the bait fish and its appurtenances to form the upper part of the mold.

When both the lower and upper parts of the mold have hardened, the upper part can be lifted off and the bait fish specimen removed and discarded, along with its hooks and eye. These same hooks and eye — or identical hooks and eye 42 through 46 — are assembled and strung together by a wire 47, for example, as seen in FIG. 4 to be positioned in the mold cavity in the appropriate impressions 22 through 26. The upper part 30 of the mold is then put back on top of the lower part and the hardware inserts 42 through 47.

The mold can then be positioned, as seen in FIG. 5 to receive the molding material 51, which may be poured from a container such as 50 through a funnel such as 52 to fill the mold cavity and embed the hooks and eye within the molding.

When the molding material is hardened within the mold, the upper and lower parts of the mold can again be separated to produce the bait fish lure complete with hooks and the necessary eye for connecting to conventional fishing lines and equipment.

The mold or cast may be made from almost any of the well known mold materials. Plaster or silicone rubber would be typical choices. Molds could also be made or duplicated by secondary steps, out of other materials or metals according to existing methods for producing or reproducing such molds.

The mold container, which is omitted for simplicity can be any container, presumably flat, that can hold the bait fish and the accessories or appurtenances to be molded. A flat, rectangular container would produce the mold shown here, and the mold material would be poured into the container in two stages.

The molding or casting material would be any of several readily-available materials such as plastics, including vinyls, resins and elastomers that can be poured into such a mold. Metal alloys can also be poured into certain types of molds.

The choice of molding material will depend on the end use of the finished lure. Heavier materials would provide heavier lures that would be desirable for trolling at lower levels. Lighter materials would provide a lure that would troll closer to the surface. Resilient materials could achieve varying degrees of flexibility of the lure to simulate the texture, and even the motion of the original bait fish.

Mold releasing agents of well known types may be used whenever and wherever necessary. The bait fish itself may or may not have enough natural oils to be released from the mold material after it hardens, and the hardware inserts such as the hooks and eye may well need release material coating during the formation of the mold as well as in the final molding or casting stage. However, during the formation of the mold, the bait fish and accessory hardware would be coated with the mold release material, whereas during the final casting of the lure, the cavities of the mold itself would be coated.

The choice of bait fish is entirely flexible, and would depend on the end use of the lure. The size of the bait fish, and its maturity may also be varied to attract certain types of same fish, according to their feeding habits and tastes.

The position of the fish in the mold may be varied to accommodate the size and shape of the fish. Since most fish are symmetrical about the vertical plane, the placement of the bait fish flat in the mold, as shown, would be an obvious choice. However, it may be possible and desirable to put the fish vertically in the lower part of the mold for different effects and placements of the accessory hardware inserts.

Aside from the use of the whole bait fish, as shown, this method allows the choice of portions of fish, such as the tail section, that may be equally attractive to game fish, and may provide a more positive placement of the hooks, etc.

The fish hooks 12–15 are shown in a typical pattern to represent a typical placement of hooks within the mold capabilities. It is obvious that more or less hooks could be used, and that their placement could be anywhere along — or even within — the bait fish. The size and shape of the hooks would be commensurate with the size and type of bait fish and the game fish for which the lure is intended. The placement of the hook is also a matter of personal preference; more of the fisherman than of the fish. External or internal diving planes or leaders or accessories, well known in the art are also compatible and within the scope of this invention.

The fish hooks and the eye may be attached to the bait fish, as in the method illustrated here to form the necessary indentations in the mold, but it will be apparent that the indentations for the hooks and other inserts could be etched, cut, or imprinted into the mold after the imprint of the bait fish is made.

While a single molding material may be used in this embodiment of the invention, it is possible to use one or more materials for special effects. For example, a first molding material can be poured into the mold to partially fill the mold, and then a second molding material can be added to fill up the mold. Thus the bottom or the head of the lure could be lighter or heavier; or of more or less resiliency than the top or the tail section of the lure.

While two rods are shown embedded in the mold material only one may be necessary in some cases, as long as the molding material flows into all the crevices of the mold. However, other rods to form access ports may be necessary to reach certain areas of the mold, or to serve as vents to allow the escape of air from the mold. The vents may be considerably smaller than the ports for introducing the molding material, and may be positioned wherever necessary to insure the complete filling of the mold.

When the two halves of the mold are assembled for the final pouring of the molding material, the mold must be positioned with a primary access port upright so that the molding material can be poured into the mold. Clamps of any type may be provided to hold the two halves of the mold tightly together, and suitable brackets may be set to hold the mold in the correct position.

The molding material may be poured into the mold, as shown, if its consistency permits this. A funnel 52 may be provided, as shown, if this will be helpful. However, many other techniques of molding are applicable here, including injection or other forms, where the molding material is put into the mold in other ways to achieve the same result.

It is to be understood that I do not desire to be limited to the exact details of construction shown and described, for obvious modifications will occur to a person skilled in the art.

What is claimed is:

1. A method for making a fishing lure comprising the steps:
   pouring mold material into a mold form to provide a lower part of a mold;
   embedding a specimen of a bait fish partially into said mold material in said lower part of said mold;
   embedding hooks of a given shape in the surface of said lower part of said mold adjoining said specimen of bait fish;
   embedding an eye of a given size adjoining the head of said specimen of bait fish;
   embedding at least one rod within said lower part of said mold between said bait fish and one of the edges of said mold;

pouring additional mold material into said mold form to cover all of the elements embedded in said lower part of said mold, and to provide an upper part of said mold;

allowing said mold material to harden or set;

separating said upper part of said mold from said lower part of said mold;

removing said specimen of bait fish, said hooks, said eye, and said rods from said mold;

positioning a series of inserts comprising hooks of said given shape, and eye of said given size, with suitable interconnecting means, in the respective cavities in said mold;

clamping said upper part of said mold to said lower part of said mold;

positioning said mold so that a cavity in said mold formed by one of said rods is pointing upwards;

pouring molding material into said mold through said cavity in said mold formed by said one of said rod cavities until said mold cavities are filled;

allowing said molding material to harden;

separating said upper and said lower parts of said mold;

removing said molded fishing lure from said mold;

cutting off any projections from said rod portions of said mold to produce a finished fishing lure.

2. A method as in claim 1 wherein said specimen of bait fish, said hooks of said given shape, and said eye of a given size are coated with a mold release compound before being partially embedded into said lower part of said mold material.

3. A method as in claim 1 wherein said cavities within said mold are coated with a mold release material before said series of inserts are added, and said molding material is poured in.

4. A method as in claim 1 wherein said specimen of bait fish comprises only a portion of an actual bait fish.

5. A method as in claim 1 wherein said molding material comprises more than one type of molding material, and each of the types of molding material is added separately to provide a fishing lure having layers of differing consistency, specific gravity, or resiliency.

6. A method as in claim 1 wherein said suitable interconnecting means is a metallic wire connecting all of said hooks to said eye.

7. A method as in claim 1 wherein additional rods are embedded within the lower part of said mold between said specimen of bait fish and a corresponding edge of said mold, to form cavities in the finished mold for the release of trapped gasses.

* * * * *